United States Patent [19]
Quantz

[11] Patent Number: 5,343,351
[45] Date of Patent: Aug. 30, 1994

[54] STARTER MOTOR PROTECTION CIRCUIT WITH RELAY PROTECTION

[75] Inventor: Chester C. Quantz, Valley Mills, Tex.

[73] Assignee: Electro-Tech, Inc., Westland, Mich.

[21] Appl. No.: 88,610

[22] Filed: Jul. 7, 1993

Related U.S. Application Data

[63] Continuation of Ser. No. 793,474, Nov. 18, 1991, abandoned.

[51] Int. Cl.⁵ .............................................. H02H 3/07
[52] U.S. Cl. ........................................ 361/33; 361/18; 361/90
[58] Field of Search ............... 361/33, 18, 23, 90, 361/160, 170

[56] References Cited

U.S. PATENT DOCUMENTS 4,490,620 12/1984 Hansen ............................. 290/38 R
4,585,986 4/1986 Dyer ................................... 323/271

*Primary Examiner*—A. D. Pellinen
*Assistant Examiner*—S. W. Jackson
*Attorney, Agent, or Firm*—Krass & Young

[57] ABSTRACT

A starter motor energized through a relay is protected from low voltages by a circuit which senses low voltages and turns off the motor relay via a transistor switch. A generator voltage sensing circuit also turns off the relay via the same switch when a generator voltage threshold is reached. For operation over a wide system voltage range, the coil of the relay is protected against high voltages by a chopper circuit which operates the transistor switch at a duty cycle of 100% at low voltages across the coil and lower duty cycles at high voltages. For a 12 volt relay the average current at higher voltages is maintained at a value approximating that obtained at a steady state 12 volts.

6 Claims, 2 Drawing Sheets

STARTER MOTOR PROTECTION CIRCUIT WITH RELAY PROTECTION

This application is a continuation of Ser. No. 07/793,474, filed Nov. 18, 1991, now abandoned.

FIELD OF THE INVENTION

This invention relates to a starter motor protection circuit and particularly including a subcircuit for protecting a relay coil from the effects of high voltages.

BACKGROUND OF THE INVENTION

In heavy vehicles such as military tanks which are subject to extreme environmental conditions the engines can be difficult to start, thus causing the battery voltage to drop at least momentarily to very low levels during starting. Since sustained low voltage operation of the starter motor can be injurious to the motor, it is the practice to provide a protection circuit for the starter motor which monitors the system voltage when the starter is first energized and disables the motor if the voltage remains below a threshold for a prescribed time period.

The protection circuit includes a relay having switching contacts in series with the starter motor. The relay coil is subject to the highly variable system voltage and must be operable throughout the voltage range. However, a coil which is selected for low voltage operation is vulnerable to being burned out if a sustained high voltage is applied. Thus it is desirable to provide some form of protection to avoid the effects of high voltage on the relay coil.

As discussed in the U.S. Pat. No. 4,585,986 to Dyer, entitled "DC Switching Regulated Power Supply For Driving an Inductive Load", it is known to use a switching control method in the art of automatic regulation of DC power to a load. The average power supplied to a load is regulated by a series switch which is operated to chop the current flowing to the load. Control is effected by varying the relative on time or duty cycle which is determined by comparing the load voltage to a reference voltage. In the present invention, it is recognized that regulation akin to that mentioned by Dyer could be applied to the high voltage protection of a relay coil in a starter protection circuit.

SUMMARY OF THE INVENTION

It is therefore an object of the invention to provide a starter motor protection circuit having a relay coil which is operable at high and low voltages and is protected from destruction by high voltage. It is another object to provide such a circuit with a subcircuit for protection of the relay coil when high voltages are applied across the coil.

The invention is carried out by a starter motor protection circuit subject to a large range of system voltage and having an output relay operable throughout the voltage range for controlling starter operation, comprising: an output relay coil subject to system voltage; switch means in series with the coil for controlling relay actuation; low voltage sensing means effective during starter operation and coupled to the switch means for turning off the relay in response to low voltage, thereby protecting the motor from low voltage; and a relay protection circuit responsive to voltage applied to the coil and coupled to the switch means for operating the switch means at a duty cycle effective to limit the average current through the coil to a safe value, thereby protecting the relay coil from the effects of high voltage.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
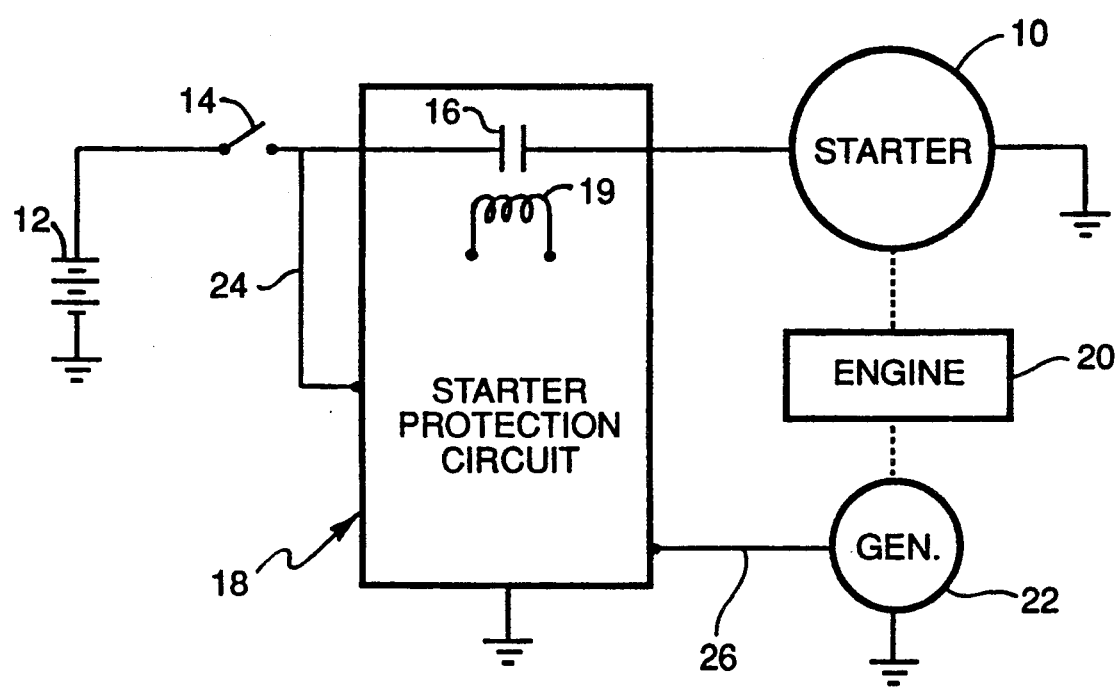
FIG. 1 is a block diagram of a vehicle starter system with a starter protection circuit according to the invention.

Referring to FIG. 1, a starter 10 is coupled to the vehicle battery 12 through a starter switch 14 and relay contacts 16 of a protective circuit 18 which includes a relay coil 19 for operating the contacts 16. The starter 10 is mechanically coupled to an engine 20 which, when it is running, drives a generator 22. A line 24 connects the battery voltage to the protection circuit 18 and a line 26 connects the generator voltage to the protective circuit. The protective circuit 18 senses the generator output voltage as well as the battery voltage to determine logically whether the contacts 16 should be opened.

In such a system, when applied to a tank, for example, the nominal battery voltage is typically 24 volts and it is required that the starter system be operable over a large voltage range such as 7 to 34 volts. Low voltages occur briefly during the initial rush of current when the starter is first turned on and normally increase rapidly. The function of the protective circuit is to monitor the system voltage and interrupt starter operation by opening the relay contacts 16 if the voltage falls below 7 volts or if the voltage fails to recover to about 12 volts within the first 0.5 second of starter operation, thereby sparing damage to the starter motor which can result from sustained low voltages. The protective circuit also senses the generator voltage and interrupts the starter operation when it attains a value, say 17 volts, which indicates that the engine has started and reached a certain speed just below idle speed.

Figure 2:
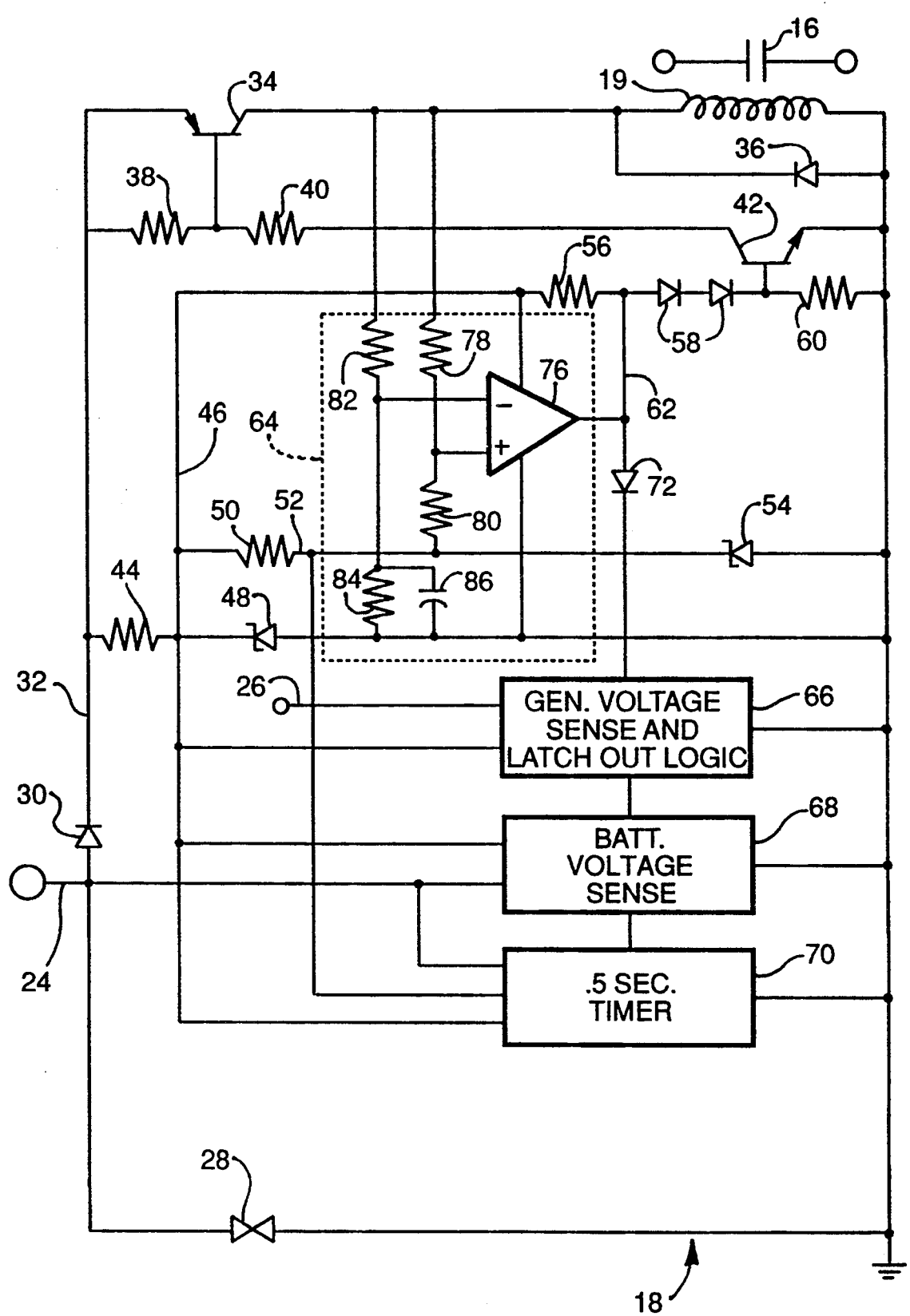
FIG. 2 is a schematic diagram of the starter protection circuit of FIG. 1.

FIG. 2 illustrates the starter protection circuit 18 having as inputs the line 24 from the battery 12 and the line 26 from the generator. A varistor 28 is connected between the input line 24 and ground for suppression of voltage spikes in the battery or system voltage. A diode 30 couples the input line 24 to a line 32 which feeds current to the relay coil 19 through the emitter and collector of a PNP transistor switch 34. A diode 36 across the coil 19 prevents inductive spikes in the coil due to current switching in the switch 34. A voltage divider comprising resistors 38 and 40 and the collector and emitter of an NPN driver transistor 42 are serially connected between the line 32 and ground such that the switch 34 is biased on to pass relay current only when the driver transistor 42 is conducting.

A resistor 44 between the line 32 and a first regulated line 46 and a zener diode 48 between the line 46 and ground establish the line 46 at a voltage of preferably 15 volts, provided the system voltage on line 32 is at least 15 volts. A second level of regulation is afforded by a resistor 50 connected between the first regulated line 46 and a reference voltage line 52 and a zener diode 54 between line 52 and ground to maintain the line 52 at 3.9 volts. The line 46 is coupled to the base of the driver transistor 42 through a resistor 56 and a pair of voltage dropping diodes 58, and the base is connected through a resistor 60 to ground, thereby normally biasing the transistor 42 on. A turn-off line 62 connected to the junction of the resistor 56 and the pair of diodes 58 is subject to ground potential for biasing the transistor 42 off. The remainder of the starter protection circuit 18 is dedicated to determining when the line 62 should be grounded to turn off the driver transistor 42.

The starter protection circuit 18 includes voltage sensitive control modules for controlling the relay coil via the turn-off line 62. The modules are a relay protection circuit 64, a generator voltage sensing and latch-out circuit 66, a battery voltage sensing circuit 68, and a 0.5 second timer 70. Except for the relay protection circuit 64, the starter protection circuit is already known in the art. The generator voltage sensing circuit 66 has inputs coupled to the generator voltage line 26 and to the first regulated line 46, and its output is coupled through a diode 72 to the turn-off line 62. When a generator voltage of at least 17 volts is sensed on line 26, the line 62 is grounded to turn off the driver transistor 42 as well as the transistor switch 34 to open the relay contacts 16. The circuit 66 includes a latch-out provision which holds the line 62 at ground potential once the it has been grounded. To reset the latch and remove the ground potential both the generator voltage and the system voltage must be removed. Essentially, then, the latch will be reset when the starter switch 14 is open and the engine is not running.

The battery voltage sensing circuit 68 has inputs connected to line 24 and the first regulated line 46, and its output connected to the generator voltage sensing circuit 66. The timer 70 has inputs connected to the line 24 and to the second regulated line 52, and its output also connected to the generator voltage sensing circuit 66 via the battery voltage sensing circuit 68. Both the timer 70 and the battery voltage sensing circuit have the ability to provide a positive signal to the generator voltage sensing circuit 66 to maintain the line 62 at a positive potential, providing the circuit 68 does not override the signal. Upon initial closure of the starter switch 14, the timer 70 maintains the positive signal for 0.5 second if the battery voltage on line 24 stay above 7 volts for that period. If at the end of the 0.5 second timer period the battery voltage recovers to about 12 volts, the battery voltage sensing circuit 68 will supply the positive signal to maintain the relay contacts 16 closed to continue operation of the starter motor until the generator voltage reaches 17 volts. On the other hand, the occurrence of a battery voltage below 7 volts during the 0.5 second timer period or a voltage below the 12 volt threshold after the timer period will cause removal of the positive signal and the line 62 will be grounded to halt the starter motor operation, and the latch will be set.

When the system voltage is subject to high voltages, it is important to prevent the relay coil 19 from being burned out due to high power dissipation in the coil. In particular, it is required that the system be operable at voltages from 7 volts to 34 volts. The high voltage may occur during starting when, for example, the system experiences battery failure and a jump start is provided from another vehicle operating at its maximum allowed voltage. A 12 volt coil 19 can be used and is capable of operation at 7 volts. While short bursts of such high voltage do not cause a dangerous level of average power dissipation, a sustained high voltage will do so. The relay protection circuit 64 prevents a sustained high voltage on the relay by sensing the voltage across the relay and, when the voltage exceeds 12 volts, reducing the average current through the coil to an equivalent of that due to a sustained 12 volts by chopping the current.

The relay protection circuit 64 comprises an operational amplifier utilized as a comparator 76. Power inputs are coupled to line 46 and ground. Resistors 78 and 80 serially connected between the positive side of the relay coil 19 and the 3.9 volt reference line 52 comprise a first voltage divider and the junction point of the resistors is connected to the positive input of the comparator 76. Resistors 82 and 84 serially connected between the positive side of the relay coil 19 and ground comprise a second voltage divider and the resistor junction point is connected to the negative input of the comparator 76. A capacitor 86 is connected across the resistor 84. The output of the comparator 76 is coupled to the line 62 so that when the comparator output goes to ground potential the driver transistor 42 and the transistor switch 34 are turned off, and when the comparator output goes positive the switch 34 is turned on, provided that the circuit 66 allows a positive voltage on line 62. The remainder of the description below assumes that the line 62 is enabled to be positive by the circuit 66.

The resistor 78–84 values are chosen so that for system voltages at or below 12 volts the positive input voltage of the comparator 76 will be greater than or equal to the negative input voltage. For system voltages higher than 12 volts the voltage at the negative input can become larger than at the positive input to turn off the comparator 76 and thus turn off the switch 34. That action reduces the negative input voltage at a rate allowed by the discharge of the capacitor 86 to a level which causes comparator turn-on. The comparator turn on closes the switch 34 which reapplies the voltage to the relay coil causing the capacitor 86 to recharge to a value sufficient to turn off the comparator, thereby repeating the cycle. Thus the comparator 76 and associated circuit comprises an oscillator or chopper which supplies current pulses to the relay coil 19. The duty cycle of the oscillator and of the current pulses decreases from 100% at 12 volts to a lower value, say 35%, at 34 volts so that the average current and power dissipation is approximately equivalent to that of a steady state 12 volt across the relay.

The variation of the duty cycle as a function of coil voltage is a result of the hysteresis voltage across the resistor 80 and the time required for the capacitor to charge and discharge by the amount of the voltage changes. When the switch 34 is open, there is no voltage drop across resistor 80 and the voltage on the positive input is the reference voltage or 3.9 volts. The capacitor 86 must discharge through the resistor 84 to reach that reference voltage and permit comparator turn on. When the switch 34 closes, the voltage across resistor 80 increases as a function of the coil voltage, with higher coil voltage resulting in higher resistor 80 voltage. Then the capacitor 86 must charge through resistor 82 by an amount equal to the resistor 80 voltage drop to cause comparator turn-off. When the coil voltage is high the charging occurs rapidly, resulting in short on periods. When the comparator is off, longer discharge periods are required for higher resistor 80 voltage drops. It follows that larger system voltages applied to the coil result in lower duty cycles.

Component values found to be desirable for the oscillator circuit are: resistor 78, 510 K ohms; resistor 80, 1 K ohm; resistor 82, 18 K ohms; resistor 84, 10 K ohms; and capacitor 86, 1.2 $\mu$f. With these values the oscillator has a frequency of about 200 HZ for voltages slightly above 12 volts and somewhat higher frequencies for higher voltages.

The embodiments of the invention in which an exclusive property or privilege is claimed are defined as follows:

We claim:

1. A starter motor protection circuit for protecting a starter motor and relay coil over a wide range of coil voltages during starter operation, comprising:
   low voltage sensing means for de-energizing the relay coil in response to a low coil voltage to protect the starter motor; and
   a relay protection circuit for reducing the average current through the relay coil in response to a high coil voltage to protect the relay coil.

2. The starter motor protection circuit as set forth in claim 1, and further including:
   switch means in series with the relay coil for controlling the actuation of the coil;
   wherein the low voltage sensing means and the relay protection circuit are coupled to the switch means, the low voltage sensing means opening the switch means to de-energize the relay coil in response to the low coil voltage and the relay protection circuit operating the switch means at a duty cycle that reduces the average current through the coil.

3. The starter motor protection circuit as set forth in claim 2, wherein the relay protection circuit maintains the switch means at a 100% duty cycle when the coil voltage is below a desired value and decreases the duty cycle in relation to the amount that the coil voltage exceeds the desired value.

4. The starter protection circuit as set forth in claim 3, wherein the relay protection circuit includes:
   a comparator coupled to the switch means, the comparator comparing the coil voltage to a reference voltage, the comparator being turned off when the coil voltage exceeds the desired value, thus opening the switch means to de-energize the relay coil; and
   timing means responsive to the coil voltage for turning on the comparator, thus closing the switch means to energize the relay coil and establish a duty cycle that decreases as the coil voltage increases above the desired value.

5. A relay protection circuit, comprising:
   a switch for selectively applying a voltage to a relay coil; and
   a chopper circuit coupled to the switch for operating the switch at a duty cycle that reduces the average current in the relay coil when the coil voltage exceeds a desired value, the chopper circuit including;
   a comparator;
   a first voltage divider subject to the coil voltage and a reference voltage for providing a first voltage input to the comparator; and
   a second voltage divider having a pair of resistors connected across the coil and subject to the coil voltage and having a capacitor connected across one of the resistors to establish a time constant, the second voltage divider providing a second voltage input to the comparator as a function of the time constant;
   wherein the first and second voltage inputs to the comparator establish a duty cycle that decreases from 100% as the coil voltage increases above the desired value.

6. The relay protection circuit as set forth in claim 5, wherein:
   the first voltage input is coupled to the positive comparator input and has a value equal to the reference voltage plus a hysteresis value when a coil voltage is present, the hysteresis value being dependent on the coil voltage; and
   the second voltage input is coupled to the negative comparator input and the capacitor is connected between the negative comparator input and ground, the second voltage input varying with time between the reference voltage and the reference voltage plus the hysteresis voltage.

* * * * *